June 16, 1931. E. S. EWART 1,809,837
TUBING MACHINE
Filed Oct. 8, 1926
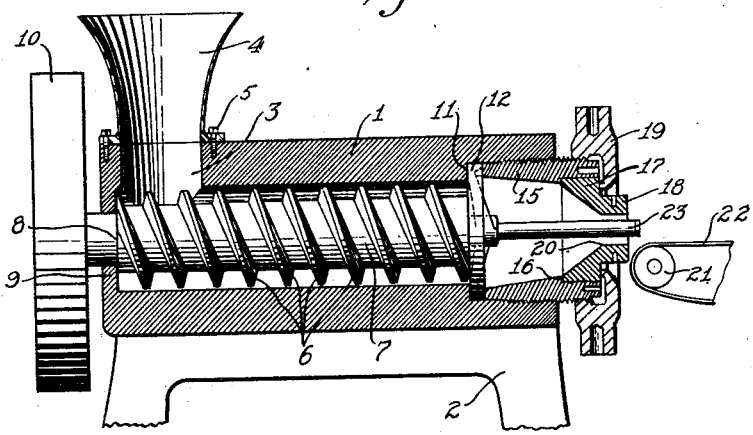
Fig. 4.
Fig. 1.
Fig. 5.
Fig. 6.
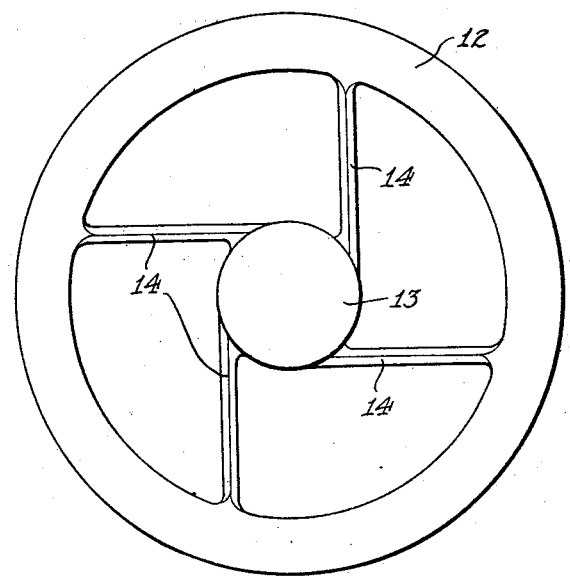
Fig. 2.
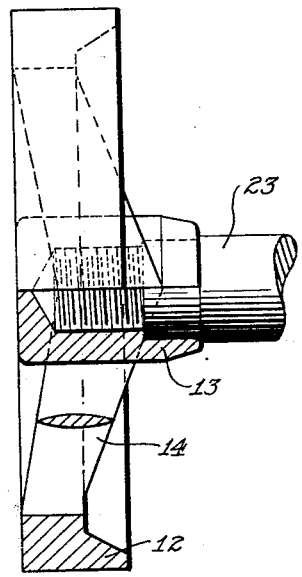
Fig. 3.
INVENTOR:-
Elliott S. Ewart.
BY
Ernest Hopkinson
ATTORNEY Patented June 16, 1931

1,809,837

UNITED STATES PATENT OFFICE

ELLIOTT S. EWART, OF DETROIT, MICHIGAN, ASSIGNOR TO MORGAN & WRIGHT, OF DETROIT, MICHIGAN, A CORPORATION OF MICHIGAN

TUBING MACHINE

Application filed October 8, 1926. Serial No. 140,350.

This invention relates to an improvement in tubing machines for forming tubular rubber articles and more particularly to an improvement in that part of the machine known as the spider through which the rubber stock is forced and which supports the central portion of the die.

In extruding rubber tubing of various sections from tubing machines, as heretofore accomplished, the rubber is forced between radially extending arms of a spider or through a plate perforated with numerous holes into a die chamber of general tubular outlines, the spider or plate forming a support for the central part of the die. The separate masses of rubber stock formed in passing the spider or plate are caused to converge while in the die chamber and tend to cohere to form a tubular mass which then issues from a die of desired cross section. In using the spiders previously known, the rubber stock is not forced together uniformly in the die chamber so that a tube having side walls of equal thickness throughout is extruded from the die.

It is an object of this invention to provide a spider of such construction that rubber composition passed through it and extruded from the die will have sidewalls of uniform thickness.

Other objects will be apparent from the accompanying specification and from the drawings in which latter:

Fig. 1 is a vertical sectional view through a tubing machine;

Fig. 2 is an end elevation of the spider;

Fig. 3 is a side elevation of the spider and pin with parts broken away;

Figs. 4 and 5 are cross sectional views of tubing as previously formed; and

Fig. 6 is a cross sectional view of tubing as made according to the present invention.

The extruding machine illustrated in Fig. 1 comprises a cylinder 1 mounted on a supporting frame 2 and provided with an opening 3 at one end over which is placed an inlet funnel 4, which is secured to the cylinder by screws 5. Means for propelling rubber stock forwardly through the cylinder comprises a worm 6 mounted upon a shaft 7. The shaft 7 is reduced at one end forming a shoulder 8 which bears against the end wall 9 of the cylinder. The reduced portion of the shaft 7 passes through the end wall 9 of the cylinder in rotatable relation thereto and carries rigidly upon its outer end a pulley wheel 10 which is connected to a source of power by means of a belt (not shown).

The die proper is formed at the open end of the cylinder 1 by the following arrangement of parts. The cylinder is counterbored inwardly from the open end to a position adjacent the end of the worm where the shoulder 11 is formed. The counterbored portion is provided with screw threads. A spider comprising a rim 12, a hub 13 and arms 14 is adapted to be positioned in the counterbore bearing against the shoulder 11. These arms 14 are sloped in an axial direction so that their cutting edges are inclined to the flow of the plastic material, thereby producing a uniformly cut surface of the plastic mass when forced against the cutting edges of the blades, as the cutting action progresses inwardly of the spider.

An externally threaded sleeve 15 is threaded into the counterbore to bear against the rim 12 of the spider and hold it in place. The inner surface of the sleeve converges gradually from the spider toward its outer end for a portion of the length of the sleeve to a shoulder 16 from the base of which extends a cylindrical portion. A collar 17 is adapted to fit within the cylindrical portion bearing against the shoulder 16 of sleeve 15.

The sleeve 15 and the collar 17 are locked together by means of a clamp 19 which has screw threaded engagement with the outer surface of the sleeve 15 and clamping engagement with the collar 18. The inner surface of the collar tapers sharply from its inner end to a point 20 from which it extends in the shape of a cylinder 18 to the outer end forming the orifice of the die. There has thus been formed a die chamber of a generally conical shape having an enlarged opening at its inlet end, tapering gradually for a portion of its length toward the outlet end and then converging sharply toward the cylindrical opening which leads to the orifice.

Such a chamber is strongly and tightly made to withstand considerable pressure without leakage.

Positioned just beyond the extrusion orifice is a roller 21 which constitutes one of the supporting members for a conveyor belt 22 which is to receive and remove the extruded tubing.

In extruding rubber stock from a die in the form of a tube, it is necessary to provide some sort of a central core which will cooperate with the exterior die to form the tube. This function is performed by the center pin 23 which extends through the center of the opening and is held in place by an integral or other secure connection with the hub of the spider. Since the center pin must be held firmly in place in exactly the proper position in the orifice, both the pin and the spider are strongly made and the rim of the spider and the shoulder upon which it bears are accurately formed. A plurality of arms, preferably four in number, extend from the rim to the hub to hold the hub rigidly in place, and the centering pin 23 by means of its connection with the hub, extends rigidly outward into the orifice. More or fewer arms than four can be used as desired, it being essential that the pin 23 be rigidly held in place.

In the operation of the extruding machine, the worm is rotated in a direction to carry material toward the die chamber. Pieces of sufficiently plastic rubber stock are fed to the worm through the funnel shaped member 4 and carried by the worm into the die chamber. Upon passing from the worm into the chamber, the stock is forced through the apertures between the arms of the spider and becomes divided into segments separated by a distance equal to the width of the arms. Since the arms of the spider are tangentially directed from the hub of the inner die, the stock passing through the arms is divided into separate masses, the lines of cleavage of which are also tangential with respect to the hub. As the stock continues through the converging die chamber, pressure is exerted on it substantially radially inwardly, and as the lines of cleavage between the separated portions of stock are tangentially and not radially directed, the pressure exerts a maximum effect in reuniting the separate portions of stock so that they issue from the tubing orifice as a unitary mass.

In Fig. 4 is illustrated a cross section of tubing made when using a spider employing a plate perforated with numerous holes. Fig. 5 illustrates a cross section of a tube the rubber stock for which has passed through a spider having radially extending arms. When stock is passed through a tube of the previously known type, for instance one having radial supporting arms for the center pin or die, the lines of cleavage between the portions of stock are radial to the die and as the stock passes through the tapering extrusion chamber, the pressure exerted on the separate portions is also directed mainly radially inward, with the result that the separate portions of stock do not become thoroughly reunited again and the extruded tube is formed with thin spots in its wall as shown in Fig. 5. Substantially the same action takes place when the spider is in the form of a perforated plate, with the result that the wall of the extruded tube is formed with numerous thin spots as shown in Fig. 4. In Fig. 6 is illustrated a cross section of tubing which is formed after the stock has been passed through the type of spider which constitutes the present invention. Such a tube has walls of uniform thickness.

Having thus described my invention, what I claim and desire to protect by Letters Patent is:

1. In a tubing machine, a die chamber having at the outlet end a discharge orifice with the walls of the chamber adjacent said orifice abruptly converging thereon, a spider at the inlet end of said chamber at an interval from said converging walls, and a core supported by said spider and extending longitudinally of said chamber into said orifice, said spider having axially inclined arms extending tangentially from the core, in combination with means for continuously forcing plastic stock between the arms and through said orifice.

2. In a tubing machine, an elongated die chamber having at the outlet end a discharging orifice and at the inlet end a core supporting spider, the walls of the chamber tapering gradually from said chamber for a portion of the length of the chamber and then converging abruptly on said discharge orifice, and a core supported by said spider and extending therefrom axially through said chamber and said orifice, the arms of said spider being axially inclined and tangential to said core, in combination with means for continuously forcing plastic stock between the arms and through said orifice.

3. A tubing machine comprising a spider web having blades arranged tangentially to the hub, such blades having their cutting edges inclined axially of the spider.

4. In a tubing machine, a spider comprising arms tangentially extending from a hub, said arms being positioned at an incline to the direction of flow of the plastic material and having cutting edges facing the direction of flow of the plastic material.

Signed at Detroit, county of Wayne, state of Michigan, this 2nd day of October, 1926.

ELLIOTT S. EWART.